United States Patent
Herriman

(10) Patent No.: US 12,270,167 B2
(45) Date of Patent: *Apr. 8, 2025

(54) PET WASTE BAG RETAINER AND ORGANIZER SYSTEM AND METHODS FOR USING THE SAME

(71) Applicant: Houndswag, LLC, Cape Elizabeth, ME (US)

(72) Inventor: Elizabeth Herriman, Cape Elizabeth, ME (US)

( * ) Notice: Subject to any disclaimer, the term of this patent is extended or adjusted under 35 U.S.C. 154(b) by 638 days.

This patent is subject to a terminal disclaimer.

(21) Appl. No.: 17/576,451

(22) Filed: Feb. 1, 2022

(65) Prior Publication Data

US 2023/0175219 A1 Jun. 8, 2023

Related U.S. Application Data

(63) Continuation of application No. 17/544,299, filed on Dec. 7, 2021.

(51) Int. Cl.
*E01H 1/12* (2006.01)
*A01K 27/00* (2006.01)

(52) U.S. Cl.
CPC .......... *E01H 1/1206* (2013.01); *A01K 27/008* (2013.01); *E01H 2001/1286* (2013.01)

(58) Field of Classification Search
CPC .......... E01H 1/1206; E01H 2001/1286; A01K 27/008; B65F 1/06
USPC ........................................................ 294/1.4
See application file for complete search history.

(56) References Cited

U.S. PATENT DOCUMENTS

| | | | | |
|---|---|---|---|---|
| 1,265,996 | A | * | 5/1918 | Cerny ................... B65B 67/12 141/390 |
| 3,754,785 | A | * | 8/1973 | Anderson ............... A47L 13/52 294/1.4 |
| 4,191,414 | A | * | 3/1980 | Dameron ............ B65B 67/1238 294/1.4 |
| D324,441 | S | * | 3/1992 | Werner ........................... D34/5 |
| 5,400,572 | A | * | 3/1995 | Peck ..................... E01H 1/1206 294/1.3 |
| D458,116 | S | * | 6/2002 | Roethler ........................ D8/367 |
| 7,753,322 | B1 | * | 7/2010 | Peterson ............ B65B 67/1233 248/101 |
| 7,789,441 | B1 | * | 9/2010 | Conway ................ E01H 1/1206 294/1.3 |
| D713,697 | S | * | 9/2014 | Prazen .............................. D8/1 |
| D727,625 | S | * | 4/2015 | Ellingson ....................... D3/328 |
| D887,143 | S | * | 6/2020 | Herriman ....................... D3/328 |
| 2011/0272955 | A1 | * | 11/2011 | Zidulka ................ A01K 23/005 294/1.3 |
| 2020/0245594 | A1 | * | 8/2020 | Herriman ............. A01K 27/008 |

* cited by examiner

*Primary Examiner* — Paul T Chin
(74) *Attorney, Agent, or Firm* — David J. Connaughton, Jr.; Justin P. Tinger; Yafei Xue

(57) ABSTRACT

A pet waste bag retainer and organizer system that allows for a roll of bags to be retained by a tail portion of the system, wherein the tail puts an internal pressure on the cavity or core of the roll bags. The system further including a retaining portion for the carrying of used pet waste bag, thus helping the user to not have to carry the used pet waste bag until it can be disposed of. The retaining portion includes an opening designed to allowed a knotted bag to pass therethrough and down a retention slot having retention protrusion extending into the retention slot that helps secure the pet waste bag while transporting.

20 Claims, 9 Drawing Sheets

PET WASTE BAG RETAINER AND ORGANIZER SYSTEM AND METHODS FOR USING THE SAME

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

Field of the Invention

The present invention relates to a system for retaining pet waste bags.

Description of the Prior Art

Present techniques for retaining waste bags including stuffing bags into a malleable container. Additionally, various clips also exist to carry used waste bags until they can be disposed of. The present application and embodiments seek to improve upon the current systems, integrate those into a streamlined system and method the solves the problem of both carrying unused waste bags as well as used waste bags until they can be disposed of.

SUMMARY

In one embodiment disclosed herein a pet waste bag retainer and organizer system for use with a waste bag and roll of bags comprises a unitary loop having a receiving section and retention section, wherein the receiving section has an opening therein configured to receive a knotted waste bag, and where the retention section is comprised of a pair or substantially parallel legs that form a retention slot; a retention protrusion disposed on one of the parallel legs and extending into the retention slot; and a bag retaining tail portion extending from the retention section, wherein the bag retaining tail portion includes a tail that has an open end for receiving a roll of bags.

In some variations of the above the tail portion can be curved, compressible, flexible and formed of malleable material. In each instance the tail portion can receive a roll of bags over the end portion and apply in internal pressure on the inner core or channel of the roll bags to securely retain the roll of bags onto the tail.

Other portions of the system including the unitary loop can be formed of a flexible material, such as a thermoplastic, or thin-walled metal tubing.

In some variations of the above, the organizer system can further include a connection system including a connection loop extending from the upper portion of the unitary loop.

The retention protrusion disposed in the retention slot can be formed in a semi-circle shape, triangle shape or other polygonal shape. This retention protrusion can be positioned within the retention slot near the end of the retention slot away from the receiving section, in the middle of the retention slot, or in the upper portion near the neck portion that opens into the opening portion of the upper loop. This retention protrusion, can also be optional in some variations.

The tail portion can be configured to receive the roll of bags about an open end of the tail portion and flex away from the parallel legs if the diameter of the roll of bags is such that it is larger than an original spacing between the tail portion and the legs.

In another embodiment a method of cleaning up, carrying and disposing of fecal matter of an animal comprises the steps of: 1) removing a bag from a roll of bags disposed on a pet waste bag retainer and organizer system comprised of: a unitary loop having a receiving section and retention section, wherein the retention section is comprised of a pair or substantially parallel legs that form a retention slot, a retention protrusion disposed on one of the parallel legs and extending into the retention slot, and a bag retaining tail portion extending from the retention section, wherein the bag retaining tail portion includes a tail that has an open end for receiving a roll of bags; 2) using the removed bag to grab the fecal material; 3) tying a knot in the bag containing fecal material; 4) inserting the bag with the knot through the receiving section of the pet waste bag retainer and organizer system; 4) sliding the portion of the bag just below the knot of the bag into the retention portion and over the retention protrusion; 5) transporting the bag using pet the waste bag retainer and organizer system; and 6) removing the knotted bag from the retention slot and disposing of the bag.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Figure 1:
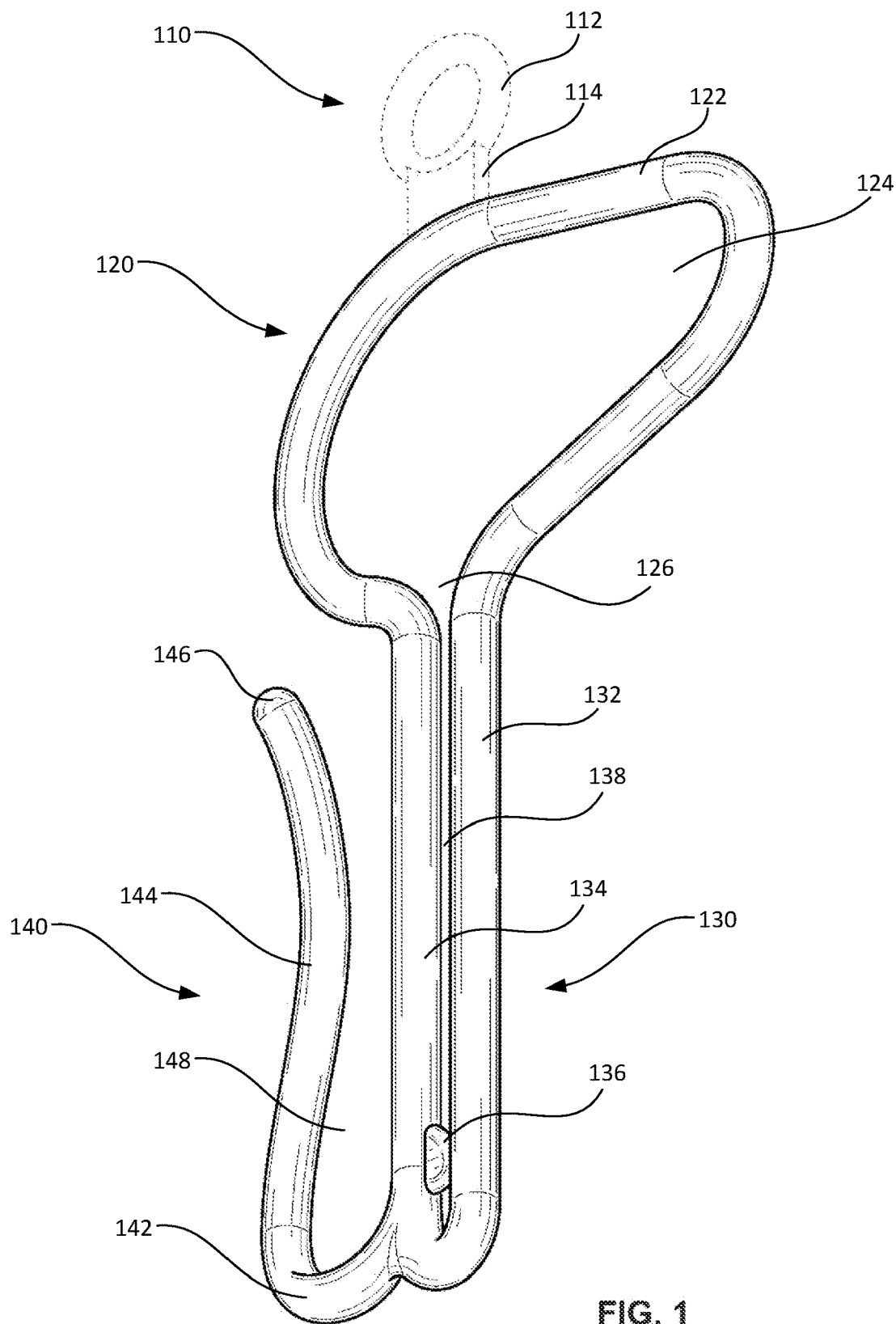
FIGS. 1-6 illustrate various views including perspective, front, right-side, left-side, top and bottom of a pet waste bag retainer and organizer system.
Figure 2:
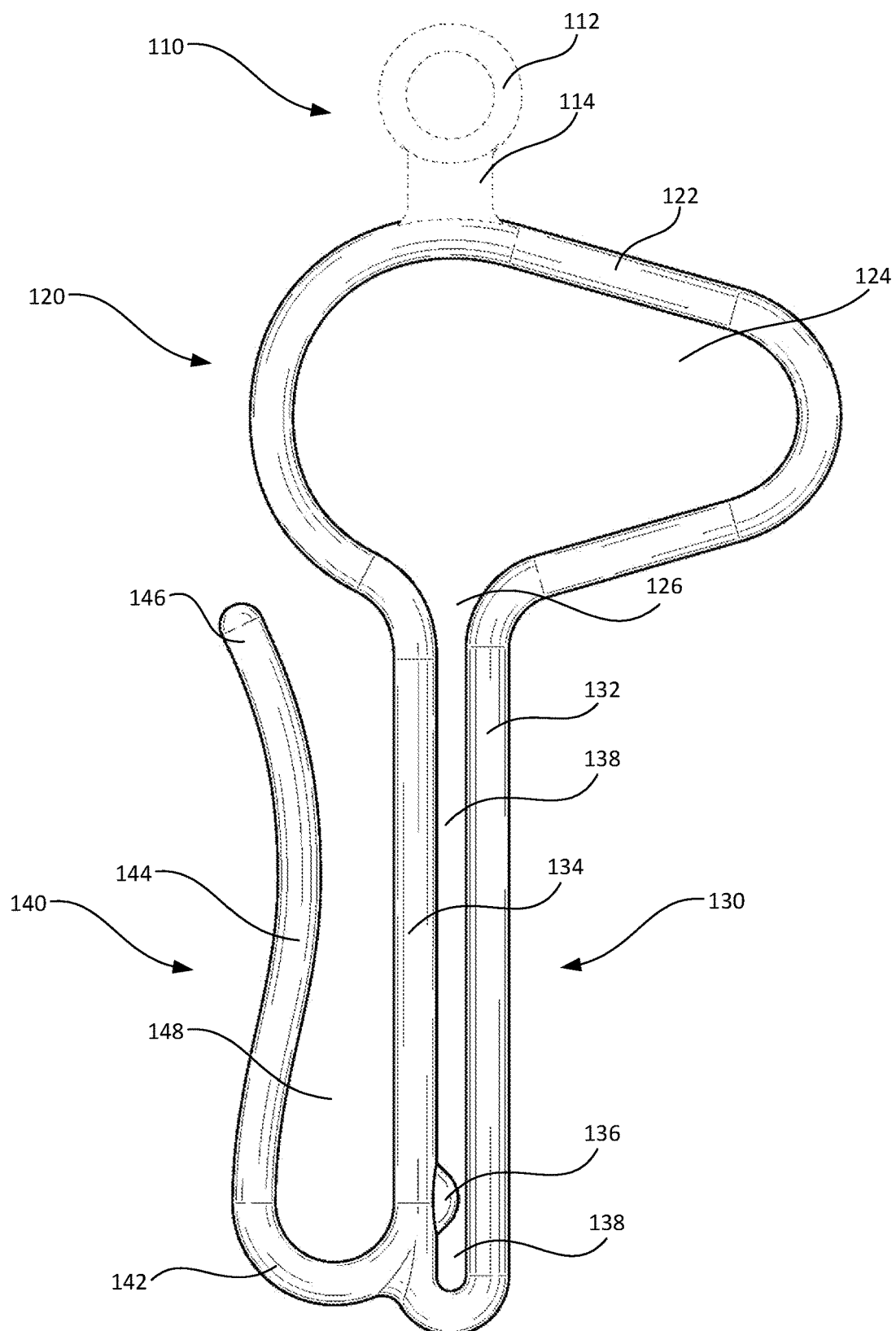
Figure 3:
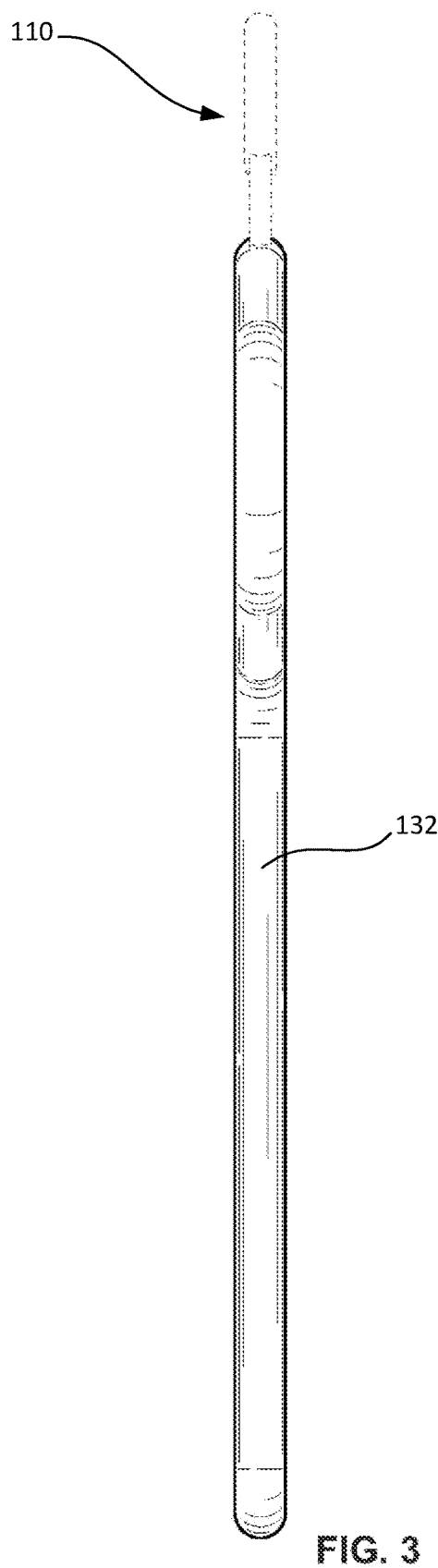
Figure 4:
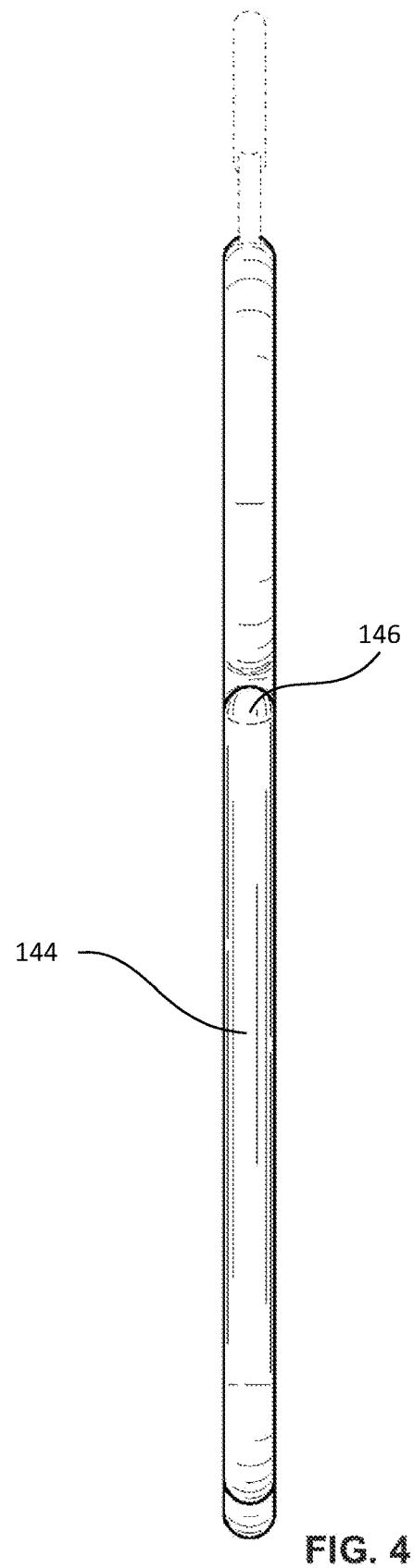
Figure 5:
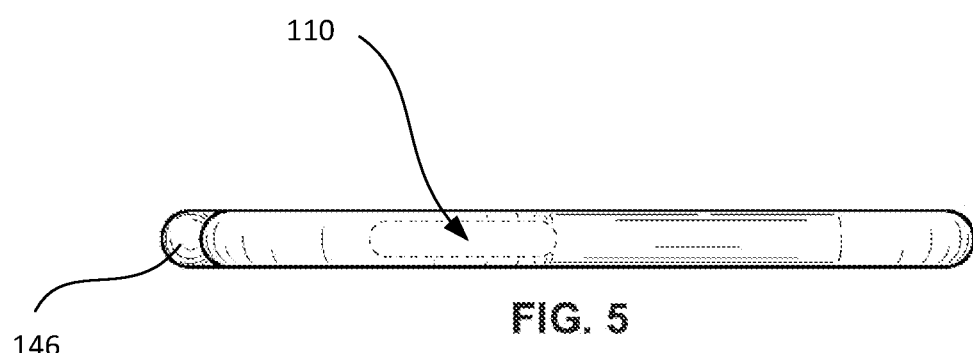
Figure 6:
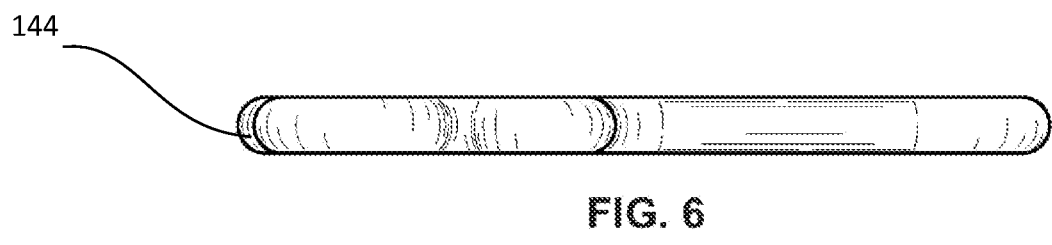

Reference will now be made to the exemplary embodiments illustrated, and specific language will be used herein to describe the same. It will nevertheless be understood that no limitation of the scope of the invention is thereby intended. An initial overview of technology embodiments is provided below and then specific technology embodiments are described in further detail later.

FIGS. 1-6 illustrate various views including perspective, front, right-side, left-side, top and bottom of a pet waste bag retainer and organizer system 100. Optionally, shown on system 100 is connection system 110, which can include a connecting ring or loop 112 that is attached to the main body portion of 100 by support 114. Loop 112 in some versions not shown can also be a clip or other style of connection mechanism. By way of example, connection system 110 using loop 112 can be used to attach system 100 to a dog leash. The upper portion or receiving portion 120 of system 100 includes a loop portion 122 that forms an opening 124 where the tied end of a pet waste bag can be received or inserted therein. The opening 124 narrows to a necking portion 126 portion, which leads to the retaining section 130 that includes a pair of parallel legs 132 and 134 that form a narrow retention slot 138 for securing a pet waste bag. Within the retention slot 138 and extending inward from leg 134 is retention protrusion 136.

The retention protrusion 136 further narrows the retention slot 138 such that when a pet waste bag is slid by and around the retention protrusion 136 that it causes the pet waste bag to be pinched between the retention portion 136 and leg 132. This helps keep the used pet waste bag from easily sliding out of the retention slot. This is particularly advantageous when a user is running with a dog and where the organizer system 100 is attached to a dog leash. While running the organizer system 100 could be swaying or swinging back and forth along with the used pet waste bag, which could slide out of the retention slot and out through the opening 124 if it was not additionally retained or pinched utilizing the retention protrusion 136. It should also be noted that legs 132 and 134 are connected at the lower end of the retaining section 130.

Also extending from the lower retaining section 130 is the bag retaining tail portion 140, which is comprised of an extension portion 142 that connects to a tail portion 144 having a non-connected end 146. The tail portion 144 and leg 134 form a passage 148. The tail 144 as shown is intentionally curved in a manner that when a roll of bags is slid onto the end 146 and down the tail 144 that the curvature of the tail 144 creates an internal force on the inside of the roll of bags to keep it retained and prevent it from sliding off.

Figure 7:
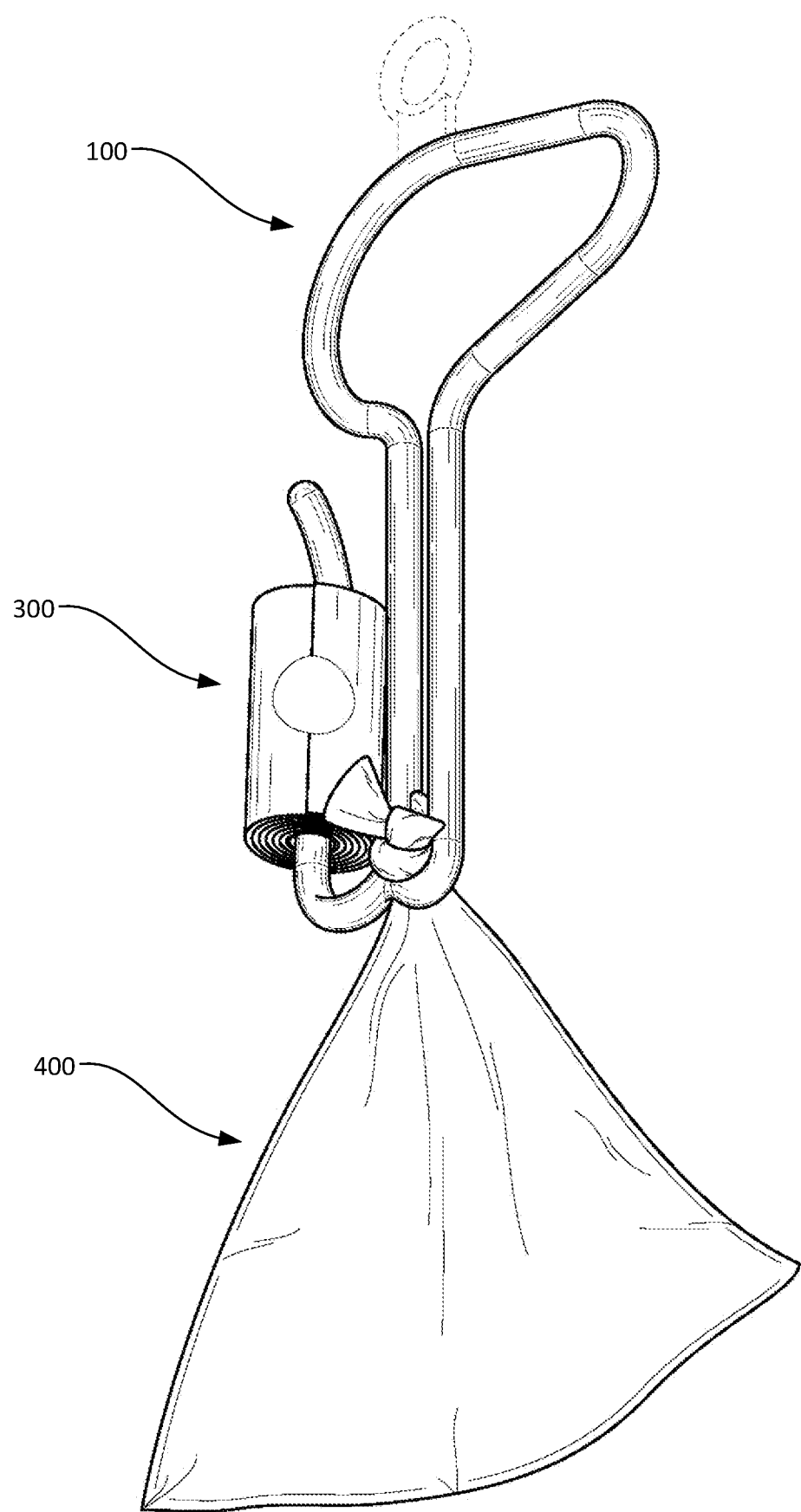
FIG. 7 illustrates the pet waste bag retainer and organizer system having a roll of bags disposed thereon, as well as a retained used waste bag.

FIG. 7 illustrates a roll of bags 300 being disposed over the tail portion 144 of the bag retaining tail portion 140 of organizing system 100. It should also be noted that the pet waste bag retainer and organizer system 100 can be formed a malleable material such as plastic that allows for a certain amount of flexure. For example, when the roll of bags 300 is placed over the tail 144, the roll of bags can have an initial diameter that is large and causes the tail to be pushed away from leg 134. In some ways this can act as another retention mechanism and in particular keep the roll of bags from unspooling. As bags are pulled off from the roll of bags, the diameter of the roll of bags is reduced and the tail 144 moves closer to the leg 134 until the original position is obtained. The extension portion 142 thereby acts as a cantilever to the tail and creates a spring-like mechanism.

The malleability of the material that forms the tail portion can also in some versions be slightly deformed and compressed, as the curvature of the tail forms a spring-like feature that puts pressure on the interior channel or core of the roll of bags 300 when it is placed thereon.

Also shown in FIG. 7, is a used pet waste bag 300, where a knot is tied on end of the bag and just below the knot the bag is retained just below the retention protrusion 136 in the retention slot 138. Here the full use of the pet waste bag retainer and organizer system 100 is conveyed, showing the advantages of an organizer system 100 that can both hold a roll of bags, as well as retained a used pet waste bag until it can be disposed of. Thus, enabling a user, such as a dog owner, to not have to try and secure separate ways or means for having available bags and retaining used pet waste bags while out on a walk or run.

It should be noted that the shape of the opening 124 and the loop portion can be formed in a variety of ways and shapes. It should also be noted that the retention protrusion 136 could be placed in the middle or upper portion of the retention slot 138, but the preferred embodiment is closer to the bottom of the retention slot 138. In yet another embodiment, the tail portion 146 can be straight and the diameter of the tail be enlarged or reduced. It is contemplated that the tail portion 144 could be formed of a foam or other compressible material that helps secure the roll of bags 300. In this way, the embodiments are not limited to a curved tail only, but can expanded to include the principle of a compressible tail that functions to retain the roll of bags 300 as it applies pressure on the inner core or cavity of the roll of bags.

In yet another variation contemplate, the retention protrusion 136 could be shaped to have a triangle shape or other angled shape, that makes it easier to slid over or past the retention protrusion, but more difficult to return past it once slide over. In this manner, the angled ramp or forms an easier 'on boarding' direction and more difficult 'off boarding' or releasing of the used pet waste bag. Currently, 136 is shown having rounded features on both ends of the protrusion and formed in a semi-circle shape.

It was noted above that legs 132 and 134 are parallel to each other. As shown, this is correct, but in another variation the retention slot could be tapered, such as in a V-shape and narrow further the closer to the bottom of the retention slot 138. The term substantially parallel means the legs look to be parallel even there could be a few degrees, such as less than 10 degrees of angular separation.

In some versions, the material used could have a grippable surface, such as a tacky surface that can also aid in retaining either the roll of bags or a use pet waste bag. This tacky surface can be positioned in the retention slot, lower portion of the retention slot, about the tail portion 146, about the outer portion of leg 134 closest to the tail portion 144 or about the entire organizer system 100.

As shown the organizer system 100 is shown as a unitary system, but by way of example, portions of the system 100 could be formed of multiple components such as the bag retaining tail portion 140.

Figure 8:
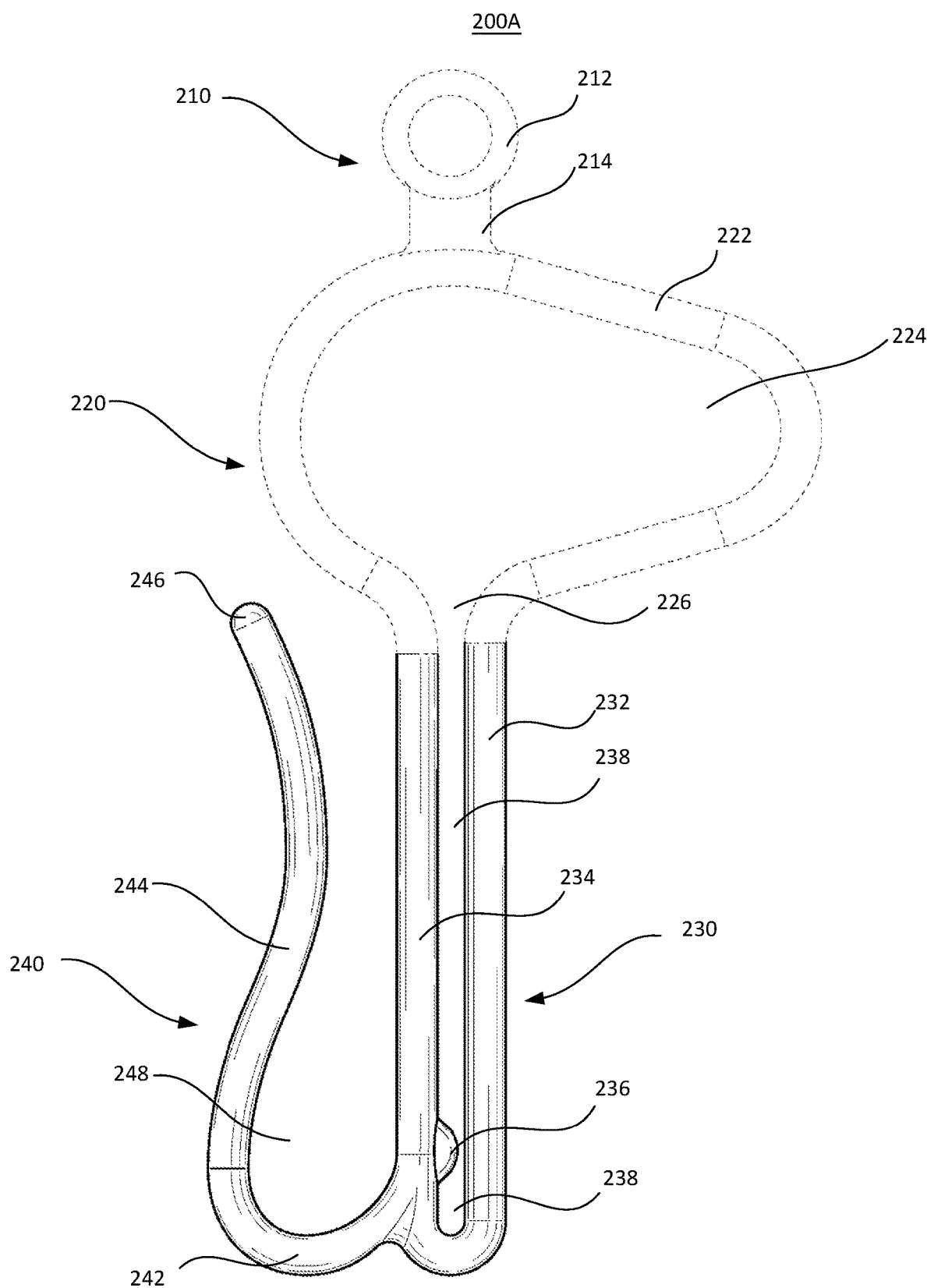
FIG. 8 illustrates a different embodiment of the pet waste bag retainer and organizer system, wherein the tail portion of this embodiment has a more pronounced S-curve.
Figure 9:
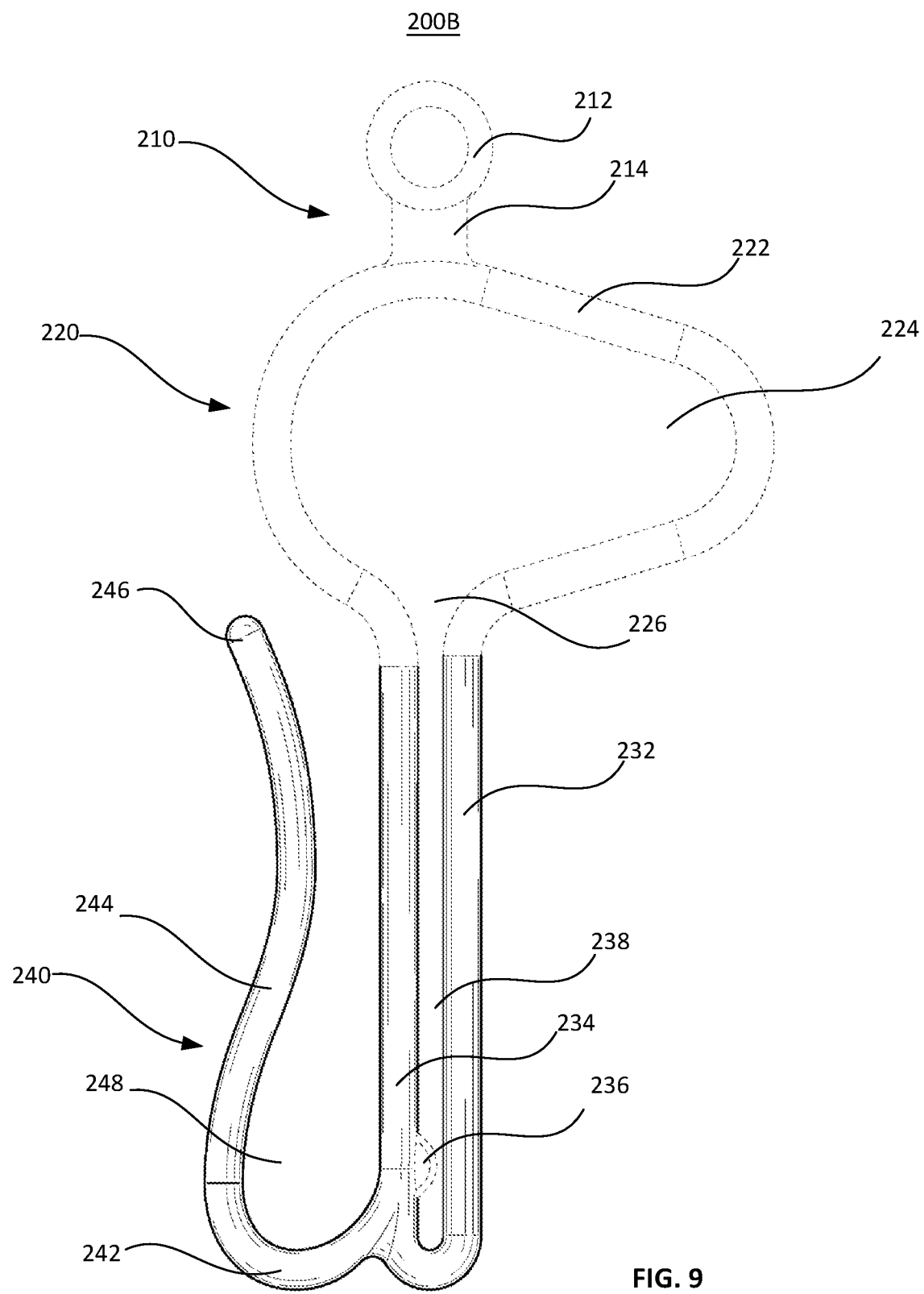
FIG. 9 illustrates a variation to FIG. 8, illustrating an optional or repositionable retention protrusion.
Figure 10:
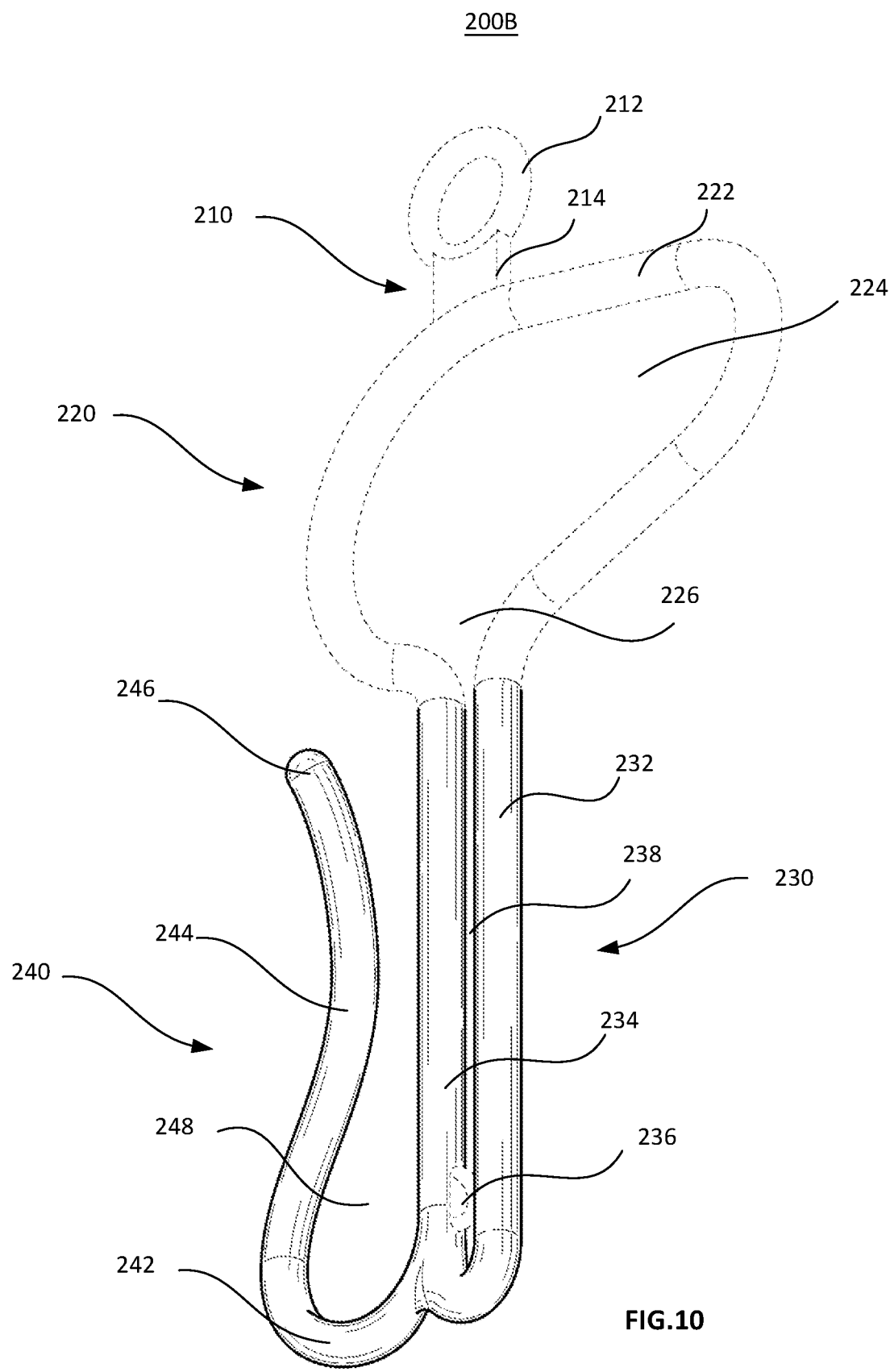
FIG. 10 is a perspective view of the pet waste bag retainer and organizer system of FIG. 9.

FIGS. 8-10 illustrates various views of a pet waste bag retainer and organizer system 200A-B that has a more pronounced S-shaped curve. The more pronounced S-shape curved tail portion 244 can provide a greater internal pressure on a roll of bags, and create a more snug fit. A more pronounced S-shape curve might be more useful for a roll of bags that has a larger internal channel diameter, while a smaller pronounced S-shape curved tail portion could be adequate to retain a roll of bags having a smaller internal channel diameter.

Shown on system 200A-B is connection system 210, which can include a connecting ring or loop 212 that is attached to the main body portion of 200A-B by support 214. Loop 212 in some versions not shown can also be a clip or other style of connection mechanism. By way of example, connection system 210 using loop 212 can be used to attach system 200A-B to a dog leash. The handle or upper portion or receiving portion 220 of system 200A-B, can be made into various shapes or loops that include a loop portion 222 that forms an opening 224 where the tied end of a pet waste bag can be received or inserted therein. The loop portion 222 is conveyed in dashed lines indicative that a variety of shapes could be used to form this loop portion 222. For example, the loop could be a star shape, it could be a head shapes with or without ears and so forth. Those skilled in the art will appreciate that the loop portion 222 could be formed of many types of caricatures.

The opening 224 narrows to a necking portion 226 portion, which leads to the retaining section 230 that includes a pair of parallel legs 232 and 234 that form a narrow retention slot 238 for securing a pet waste bag. Within the retention slot 238 and extending inward from leg 234 is retention protrusion 236. It should also be noted that the retention protrusion 236 could be placed in the middle or upper portion of the retention slot 238, but the preferred embodiment is closer to the bottom of the retention slot 238.

The retention protrusion 236 further narrows the retention slot 238 such that when a pet waste bag is slid by and around the retention protrusion 236 that it causes the pet waste bag to be pinched between the retention portion 236 and leg 232. This helps keep the used pet waste bag from easily sliding out of the retention slot. This is particularly advantageous when a user is running with a dog and where the organizer system 200A-B is attached to a dog leash. While running the organizer system 200A-B could be swaying or swinging back and forth along with the used pet waste bag, which could slide out of the retention slot and out through the opening 224 if it was not additionally retained or pinched utilizing the retention protrusion 236. It should also be noted that legs 232 and 234 are connected at the lower end of the retaining section 230.

Also extending from the lower retaining section 230 is the bag retaining tail portion 240, which is comprised of an extension portion 242 that connects to a tail portion 244 having a non-connected end 246. The tail portion 244 and leg 234 form a passage 248. The tail 244 as shown is intentionally S-curved in a manner that when a roll of bags 300 is slid onto the end 246 and down the tail 244 that the curvature of the tail 244 creates an internal force on the inside of the roll of bags to keep it retained and prevent it from sliding off.

Figure 11:
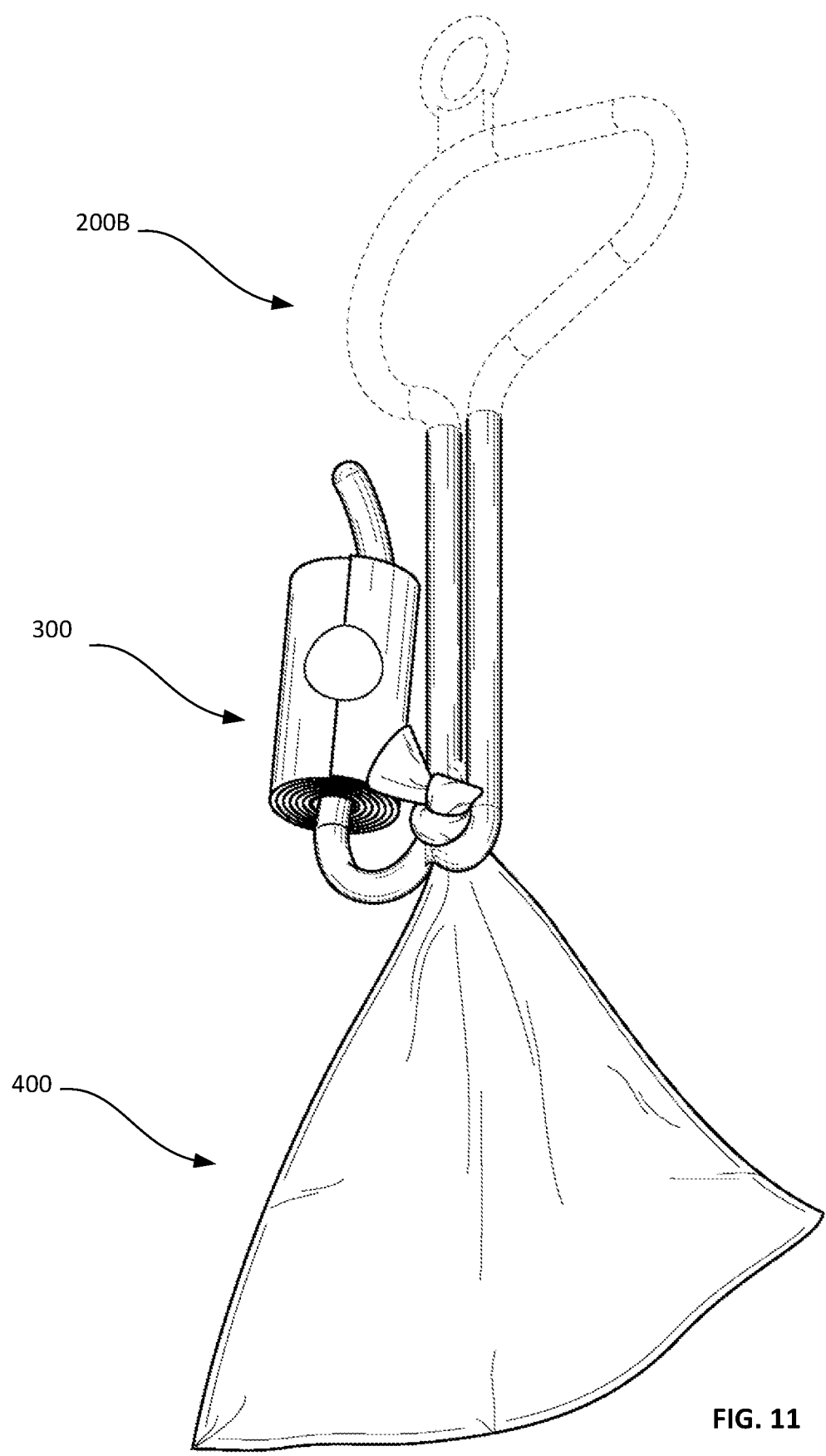
FIG. 11 illustrates the pet waste bag retainer and organizer system of FIGS. 9-10 having a roll of bags disposed thereon, as well as a retained used waste bag.

FIG. 11 illustrates a roll of bags 300 being disposed over the tail portion 244 of the bag retaining tail portion 240 of organizing system 200A-B. It should also be noted that the pet waste bag retainer and organizer system 200A-B can be formed a malleable material such as plastic that allows for a certain amount of flexure. For example, when the roll of bags 300 is placed over the tail 244, the roll of bags can have an initial diameter that is large and causes the tail to be pushed away from leg 234. In some ways this can act as another retention mechanism and in particular keep the roll of bags from unspooling. As bags are pulled off from the roll of bags, the diameter of the roll of bags is reduced and the tail 244 moves closer to the leg 234 until the original position is obtained. The extension portion 242 thereby acts as a cantilever to the tail and creates a spring-like mechanism.

The malleability of the material that forms the S-curve tail portion can also in some versions be slightly deformed and compressed, as the curvature of the tail forms a spring-like feature that puts pressure on the interior channel or core of the roll of bags 300 when it is placed thereon.

Also shown in FIG. 11, is a used pet waste bag 400, where a knot is tied on end of the bag and just below the knot the bag is retained just below the retention protrusion 236 in the retention slot 238. Here the full use of the pet waste bag retainer and organizer system 200A-B is conveyed, showing the advantages of an organizer system 200A-B that can both hold a roll of bags, as well as retained a used pet waste bag until it can be disposed of. Thus, enabling a user, such as a dog owner, to not have to try and secure separate ways or means for having available bags and retaining used pet waste bags while out on a walk or run.

It should be noted that the shape of the opening 224 and the loop portion can be formed in a variety of ways and shapes. It should also be noted that the retention protrusion 236 could be placed in the middle or upper portion of the retention slot 238, but the preferred embodiment is closer to the bottom of the retention slot 238. In yet another embodiment, the tail portion 246 can be straight and the diameter of the tail be enlarged or reduced. It is contemplated that the tail portion 244 could be formed of a foam or other compressible material that helps secure the roll of bags 300. In this way, the embodiments are not limited to a curved tail only, but can expanded to include the principle of a compressible tail that functions to retain the roll of bags 300 as it applies pressure on the inner core or cavity of the roll of bags.

In yet another variation contemplate, the retention protrusion 236 could be shaped to have a triangle shape or other angled shape, that makes it easier to slide over or past the retention protrusion, but more difficult to return past the protrusion once it has been slid over. In this manner, the angled ramp forms an easier 'on boarding' direction and more difficult 'off boarding' or releasing of the used pet waste bag. Currently, 236 is shown having rounded features on both ends of the protrusion and formed in a semi-circle shape.

It was noted above that legs 232 and 234 are parallel to each other. As shown, this is correct, but in another variation the retention slot could be tapered, such as in a V-shape and narrow further the closer to the bottom of the retention slot 238. The term substantially parallel means the legs look to be parallel even there could be a few degrees, such as less than 10 degrees of angular separation.

In some versions, the material used could have a grippable surface, such as a tacky surface that can also aid in retaining either the roll of bags or a use pet waste bag. This tacky surface can be positioned in the retention slot, lower portion of the retention slot, about the tail portion 246, about the outer portion of leg 234 closest to the tail portion 244 or about the entire organizer system 200A-B.

As shown the organizer system 200A-B is shown as a unitary system, but by way of example, portions of the system 200A-B could be formed of multiple components such as the bag retaining tail portion 240.

It should be readily determined by the above description that the problems of carrying waste bags, as well as used waste bags about the same device while walking an animal has been achieved by the methods and pet waste bag retainer and organizer system described herein.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A pet waste bag retainer and organizer system for use with a waste bag and roll of bags comprising:
   a unitary loop having a receiving section and a retention section, wherein the receiving section has an opening therein configured to receive a knotted waste bag, and where the retention section is comprised of a pair of substantially parallel legs that form a retention slot that is more narrow than the opening;
   a retention protrusion disposed on one of the parallel legs and extending into the retention slot; and a bag retaining tail portion extending from the retention section, wherein the bag retaining tail portion includes a tail that has an open end for receiving a roll of bags.

2. The pet waste bag retainer and organizer system for use with a waste bag and roll of bags of claim 1, wherein the tail portion is curved.

3. The pet waste bag retainer and organizer system for use with a waste bag and roll of bags of claim 1, wherein the tail portion is compressible.

4. The pet waste bag retainer and organizer system for use with a waste bag and roll of bags of claim 1, wherein the unitary loop is formed of a flexible material.

5. The pet waste bag retainer and organizer system for use with a waste bag and roll of bags of claim 1, further including a connection system including a connection loop extending from the upper portion of the unitary loop.

6. The pet waste bag retainer and organizer system for use with a waste bag and roll of bags of claim 1, wherein the retention protrusion is formed in a semi-circle shape.

7. The pet waste bag retainer and organizer system for use with a waste bag and roll of bags of claim 1, wherein the retention protrusion is disposed near the end of the retention slot away from the receiving section.

8. The pet waste bag retainer and organizer system for use with a waste bag and roll of bags of claim 2, wherein the curved tail portion is configured to receive the roll of bags and apply a pressure on the inner core of the roll of bags causing the roll of bags to be retained about the tail portion.

9. The pet waste bag retainer and organizer system for use with a waste bag and roll of bags of claim 1, wherein the tail portion is configured to receive the roll of bags about an open end of the tail portion and flex away from the parallel legs if the diameter of the roll of bags is such that it is larger than an original spacing between the tail portion and the legs.

10. The pet waste bag retainer and organizer system for use with a waste bag and roll of bags claim 1, wherein the curved tail portion is made of a flexible material.

11. The pet waste bag retainer and organizer system of claim 1 wherein the unitary loop is attached to a leash.

12. A method of cleaning up, carrying and disposing of fecal matter of an animal comprising the steps of:
removing a bag from a roll of bags disposed on a pet waste bag retainer and organizer system comprised of:
a unitary loop having a receiving section and a retention section, wherein the retention section is comprised of a pair of substantially parallel legs that form a retention slot that is more narrow than the receiving section,
a retention protrusion disposed on one of the parallel legs and extending into the retention slot, and
a bag retaining tail portion extending from the retention section, wherein the bag retaining tail portion includes a tail that has an open end for receiving a roll of bags;
using the removed bag to grab the fecal material;
tying a knot in the bag containing fecal material;
inserting the bag with the knot through the receiving section of the pet waste bag retainer and organizer system;
sliding the portion of the bag just below the knot of the bag into the retention portion and over the retention protrusion;
transporting the bag using pet the waste bag retainer and organizer system; and
removing the knotted bag from the retention slot and disposing of the bag.

13. A pet waste bag retainer and organizer system for use with a waste bag and roll of bags comprising:
a unitary loop having a receiving section and a retention section, wherein the receiving section has an opening therein configured to receive a knotted waste bag, and where the retention section is comprised of a pair of substantially parallel legs that form a retention slot that is more narrow than the opening; and
a bag retaining tail portion extending from the retention section, wherein the bag retaining tail portion includes a tail that has an open end for receiving a roll of bags.

14. The pet waste bag retainer and organizer system of claim 13, wherein the bag retaining tail portion is shaped in a curved shaped and upon disposing a roll of bags over the bag retaining tail portion causes the bag retaining tail portion to compress like a spring, thus applying an inward pressure on the interior of the roll of bags.

15. The pet waste bag retainer and organizer system of claim 14, wherein the bag retaining tail portion is also configured to flex away from the retention slot.

16. The pet waste bag retainer and organizer system of claim 13, further including a retention protrusion disposed on one of the parallel legs and extending into the retention slot.

17. The pet waste bag retainer and organizer system of claim 16, wherein the retention protrusion disposed on one of the parallel legs is positioned near the bottom of the retention slot.

18. The pet waste bag retainer and organizer system of claim 13, wherein the retention slot further comprises a surface that has grippable or tactile features.

19. The pet waste bag retainer and organizer system of claim 18, wherein the surface is formed of a rubber-like material.

20. The pet waste bag retainer and organizer system of claim 13 wherein the unitary loop is attached to a leash.

* * * * *